United States Patent [19]

Tomita

[11] 4,178,410

[45] Dec. 11, 1979

[54] FLAME RETARDANT COATING COMPOSITION AND FABRIC COATED THEREWITH

[75] Inventor: Mikio Tomita, Kyoto, Japan

[73] Assignee: Meisei Chemical Works, Inc., Kyoto, Japan

[21] Appl. No.: 826,486

[22] Filed: Aug. 22, 1977

[30] Foreign Application Priority Data

May 17, 1977 [JP] Japan .................................. 52-57330
Jun. 15, 1977 [JP] Japan .................................. 52-71848

[51] Int. Cl.$^2$ ...................... C08G 18/32; B32B 27/18; C08K 5/41
[52] U.S. Cl. ............................. 428/290; 260/45.95 R; 260/45.95 C; 260/30.8 R; 521/906; 528/79; 428/425
[58] Field of Search .................. 260/77.5 AP, 2.5 AP, 260/2.5 BB, 47 CB, 30.8 R, 29.2 TN, 45.95 R, 45.95 C; 528/79; 521/906; 428/290

[56] References Cited

U.S. PATENT DOCUMENTS

| | | | |
|---|---|---|---|
| 3,764,577 | 10/1973 | Burns et al. | 260/47 CB |
| 3,778,408 | 12/1973 | Burns et al. | 260/45.7 P |
| 3,937,474 | 2/1976 | Jepson et al. | 260/77.5 AP X |
| 4,046,742 | 9/1977 | Eimers et al. | 260/77.5 AN |
| 4,052,345 | 10/1977 | Austin et al. | 260/2.5 AP |

OTHER PUBLICATIONS

Textile Chemist & Colorist, vol. 5, Aug. 1973, pp. 151–159.

*Primary Examiner*—H. S. Cockeram
*Attorney, Agent, or Firm*—A. C. Nolte, Jr.; Edward B. Hunter

[57] ABSTRACT

A fabric is coated with a composition which comprises a thermoplastic polyurethane and a sulfone having the following general formula

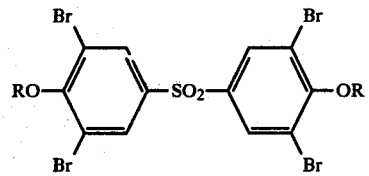

wherein R represents —H, —CH$_3$, —C$_2$H$_5$, —C$_3$H$_7$OH, —CH$_2$CH$_2$Br or —(CH$_2$CH$_2$O)$_n$H and n is an integer of 1 to 5, and preferably a polyisocyanate as a cross-linking agent.

7 Claims, No Drawings

FLAME RETARDANT COATING COMPOSITION AND FABRIC COATED THEREWITH

BACKGROUND OF THE INVENTION

This invention relates to a flame retardant coating composition, particularly relates to a flame retardant polyurethane coating composition having a good light fastness. This invention also relates to a coated fabric therewith.

Heretofore, it has been widely practiced to apply thermoplastic polyurethane composition to various fabrics, particularly to light fabrics such as polyamide and polyester fabrics. However, those coated fabrics are extremely flammable and therefore, it is necessary to make them flame retardant. Many attempts have been made to obtain flame retardant polyurethane coating composition, but satisfactory results could not have been obtained. Among them a method wherein phosphoric esters containing halogen atoms such as tris(dibromopropyl)phosphate are used in combination with polyurethane is said to be a relatively preferable method. However, those compositions lower the light fastnese of the finished fabrics to a great extent though exhibit a good flame resistance. Therefore, this method is only applicable to the limited materials and rather impractical.

An object of the invention is to provide a polyurethane coating composition superior in flame resistance and light fastness.

A further object of the invention is to provide an improved flame retardant coated fabric.

The other objects and advantage of the invention will partly be apparent and partly become clear from the following detailed description of the invention.

SUMMARY OF THE INVENTION

The flame retardant polyurethane coating composition according to the invention comprises a thermoplastic polyurethane and a sulfone which has the following general formula (I)

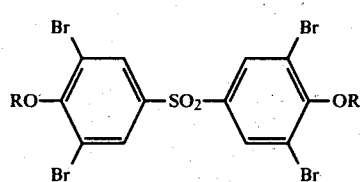

wherein R represents —H, —CH$_3$, —C$_2$H$_5$, —C$_3$H$_7$OH, —CH$_2$CH$_2$Br or —(CH$_2$CH$_2$O)$_n$H and n is a integer of 1 to 5.

The mixing ratio of sulfone having a general formula (I) to polyurethane is not limited, but it is preferable that 3-30 parts by weight, most preferably 7-20 parts by weight, of the sulfone is used with 20 parts by weight of polyurethane.

The flame retardant polyurethane coating composition is applied to fabrics to obtain polyurethane coated fabrics superior in flame resistance.

A sulfone having —(CH$_2$CH$_2$O)$_n$H group as R in general formula (I) is represented exactly by the following general formula (II)

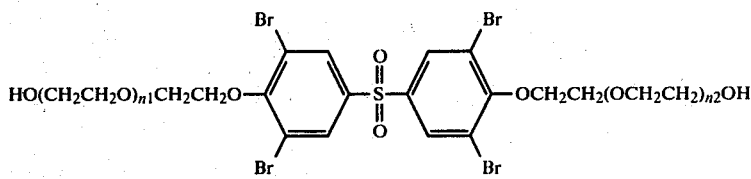

wherein each n1 and n2 is zero or a positive integer and n1+n2 is zero or an integer of 1 to 8.

DETAILED DESCRIPTION OF THE INVENTION

As a polyurethane useful in the invention, any one which is generally used as fiber treating agent and coating component can be utilized, regardless of its type or kind such as polyether polyurethane, polyester polyurethane and polyurethane polyurea. The polyurethanes useful herein are conventional and well known in the art as disclosed in "Textile Chemist and Colorist" Vol. 5 No. 8 pages 151-159 (1973). The coating composition according to the invention may be prepared in the forms of a solution in organic solvents such as dimethylformamide, methylethylketone, tetrahydrofuran, benzene and toluene, or an aqueous dispersion. The coating composition being an organic solvent solution is preferred.

The coating composition of the invention may further contain coloring agents and other additives. When a polyisocyanate compound is used in the coating composition as a cross linking agent, the physical property of the resultant polyurethane coating is found to be further improved, and the light fastnese and the flame resistance are increased. Particularly, in the coating composition comprising sulfone which has —C$_3$H$_7$OH or —(CH$_2$CH$_2$O)$_n$H group as R in general formula (I), the addition of polyisocyanate is preferred.

The isocyanate compounds useful as cross linking agent may be any compounds which have a relatively low molecular weight and contain at least two isocyanate groups in its molecule. Among them there may be included polyisocyanates such as diphenylmethane diisocyanate and triphenylmethane triisocyanate; addition products of polyisocyanate to triols such as trimethylol propane; and other active polyisocyanate prepolymers. In addition, such compounds that have temporarily blocked isocyanate groups with phenol which can be converted to active isocyanate groups by heating.

The coating composition of the invention can be applied to a wide variety of textile goods such as natural fibers, synthetic fibers, fabrics and non-woven fabrics by the conventional coating method such as a doctor knife coating method, a dipping method, a spraying method and a transferring method.

The coating compositions according to the invention show a good flame resistance which is equal or superior to that of the composition which is obtained with use of tris(2,3-dibromopropyl)phosphate. In addition, the coated fabrics of the invention have a good light fastnese and are superior in other physical properties.

PREFERRED EMBODIMENTS OF THE INVENTION

This invention will be further illustrated by the following examples.

EXAMPLE 1

10 parts by weight of bis(4-hydroxyethoxy-3,5-dibromophenyl)sulfone was added to 100 parts by weight of thermoplastic polyurethane solution (solid content: 20% by weight, solvent:methylethylketone/toluene=1/1 by weight, viscosity at 25° C.: 15000 cps) which was obtained by the reaction of polyester prepared from 1,4-butanediol and adipic acid with methylenebisphenol isocyanate (MDI), and mixed thoroughly. The polyurethane solution is a hydroxy-terminated polyurethane solution of polyurethane 3922 produced by Nikon Polyurethane Kogyo Kabushiki Kaisha.

The resultant mixture solution was applied to nylon taffeta (65 g/m$^2$) with use of doctor knife. The coated nylon taffeta was dried at a room temperature for 30 minutes and then at 110° C. for 3 minutes with hot air. After allowing to stand at a room temperature for additional 24 hours, the product was examined with respect to flame resistance and light fastness. The thickness of the coating formed on nylon taffeta was calculated according to the gravimetric method and found to be 25 microns. The results of the above examination are shown in Table 1.

EXAMPLE 2

The same procedure as in Example 1 was repeated except that bis(4-methoxy-3,5-dibromophenyl)sulfone was used instead of bis(4-hydroxyethoxy-3,5-dibromophenyl)sulfone to obtain a coated fabric. The coated fabric was examined in the same manner as in Example 1, and the resultants are shown in Table 1.

Control 1

The same procedure as in Example 1 was repeated except that tris(2,3-dibromopropyl)phosphate (TBPP) was used instead of bis(4-hydroxyethoxy-3,5-dibromophenyl)sulfone to obtain a coated fabric. This coated fabric was examined in the same manner as in Example 1, and the results are also shown in Table 1.

EXAMPLE 3

10 parts by weight of bis(4-hydroxy-ethoxy-3,5-dibromophenyl)sulfone and 5 parts by weight of ethyl acetate solution of triisocyanate compound (solid content of 75%) which was prepared from 1 mole of trimethylpropane and 3 moles of toluene diisocyanate were added as a cross linking agent to 100 parts by weight of the same polyurethane solution as in Example 1, and mixed thoroughly.

The resultant mixture solution was applied to nylon taffeta in the same manner as in Example 1.

The same examination as in Example 1 was carried out, and the results are shown in Table 1.

EXAMPLE 4

The same procedure as in Example 3 was repeated except that bis(4-hydroxypropoxy-3,5-dibromophenyl)sulfone was used instead of bis(4-hydroxyethoxy-3,5-dibromophenyl)sulfone to obtain a coated fabric. The coated fabric was examined in the same manner as in Example 1 and the resultants are shown in Table 1.

Control 2

The same procedure as in Example 3 was repeated except that tris(2,3-dibromopropyl)phosphate was used instead of bis(4-hydroxyethoxy-3,5-dibromophenyl)sulfone to obtain a coated fabric. This coated fabric was examined in the same manner as in Example 1 and the results are shown in Table 1.

Table 1

|  | Light fastness | Flame resistance |
|---|---|---|
| Example 1 | 4th grade | 4–5 |
| Example 2 | 4th grade | 5 |
| Control 1 | 1st grade | 4 |
| Example 3 | 4th grade | 4–5 |
| Example 4 | 4th grade | 5 |
| Control 2 | 1st grade | 4 |

(notes):
Light fastness: JIS L 0842 Carbon arc lamp method
Flame resistance: JIS L 1091-1973 R D method (Coil method)

The flame resistance is measured by the following steps according to Japanese Industrial Standard (JIS) L 1091-1973, D method.

A sample sheet having a width of 100 mm and a weight of 1 g is prepared. The sheet is rolled with a width of 100 mm. The rolled sample is placed in a coiling supporter maintained at an angle of 45°. The bottom end of the rolled sample is contacted with the flame of a burner to heat the sample until the burning of it stopped. This burning step is repeated. The number of burning steps required to burn up 90 cm of the rolled sample from the bottom of it are measured.

The light fastness is measured by the following steps according to Japanese Industrial Standard (JIS) L 0845.

A sample sheet is attached to a test holder with a blue scale having eight grades and exposed to carbon arc lamp light. Then, the colour fastness of the sample sheet is measured in terms of the grade of the blue scale which indicates the most similar discoloration to that of the sample sheet. The larger the grade, the superior the colour fastness.

What we claim is:

1. A flame retardant coating composition which consists essentially of a hydroxyl-terminated thermoplastic polyurethane and a sulfone additive having the general formula

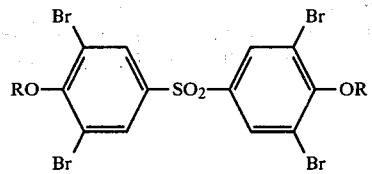

wherein R represents —H, —CH$_3$, —C$_2$H$_5$, —C$_3$H$_7$OH, —CH$_2$CH$_2$Br, or —(CH$_2$CH$_2$O)$_n$H and n is an integer of 1 to 5, in the weight ratio of 20 parts polyurethane to 3–30 parts sulfone.

2. A flame retardant coating composition as defined in claim 1, wherein said coating composition contains 20 parts by weight of thermoplastic polyurethane and 7–20 parts by weight of said sulfone as an additive.

3. A flame retardant coating composition as defined in claim 1, wherein said coating composition is an organic solvent solution.

4. A coated fabric which is obtained by applying to a fabric a coating composition containing an organic solvent solution of a hydroxyl-terminated thermoplastic polyurethane admixed with a sulfone having the following general formula

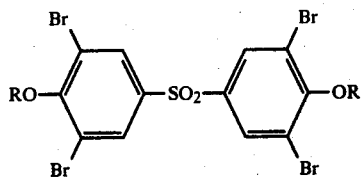

wherein R represents —$CH_3$, —$C_2H_5$, —$C_3H_7OH$, —$CH_2CH_2Br$ or —$(CH_2CH_2O)_nH$ and n is an integer of 1 to 5, in the weight ratio of 20 parts polyurethane to 3–30 parts sulfone.

5. A coated fabric as defined in claim 4, wherein said coating composition consists essentially of a mixture of 20 parts by weight of thermoplastic polyurethane and 3–20 parts by weight of said sulfone.

6. A coated fabric as defined in claim 5, wherein said coating composition consists essentially of a mixture of 20 parts by weight of thermoplastic polyurethane and 7–20 parts by weight of said sulfone.

7. A coated fabric as defined in claim 4, wherein said coating composition is an organic solvent solution.

* * * * *